Aug. 5, 1941.  F. RADICH  2,251,856
POWER DEVICE
Filed Aug. 8, 1940   3 Sheets-Sheet 1
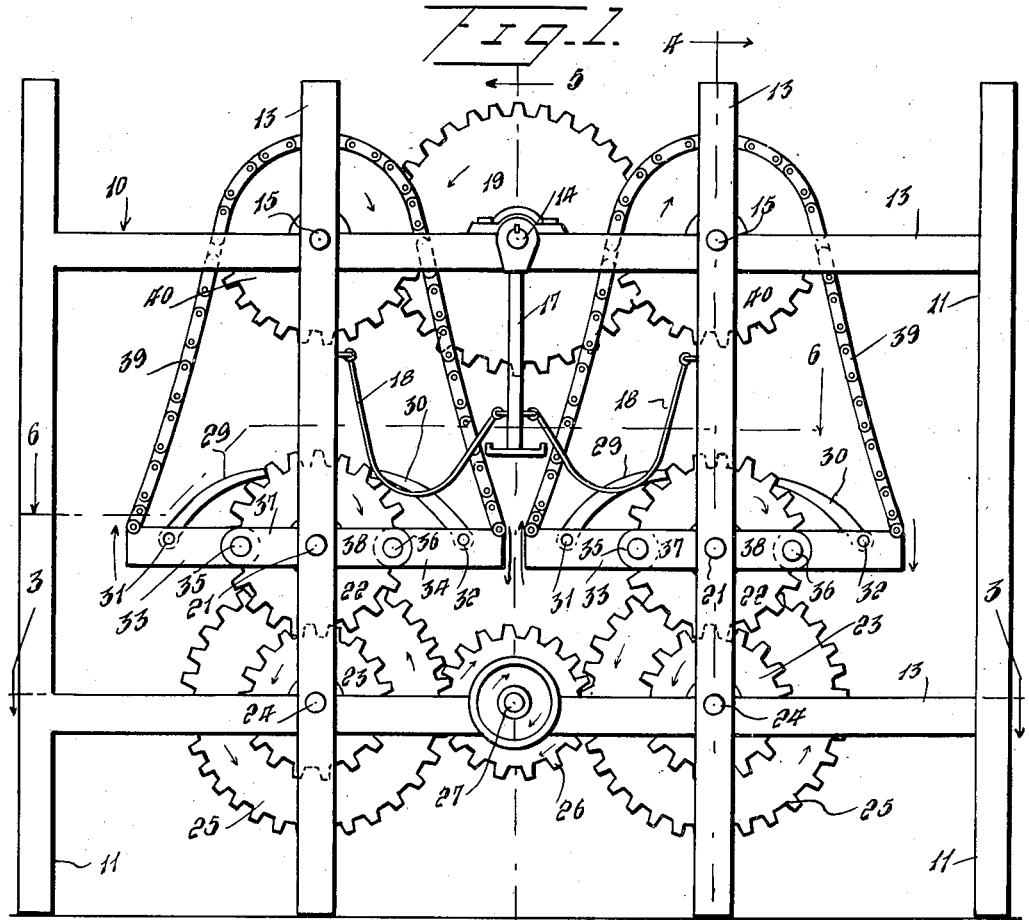
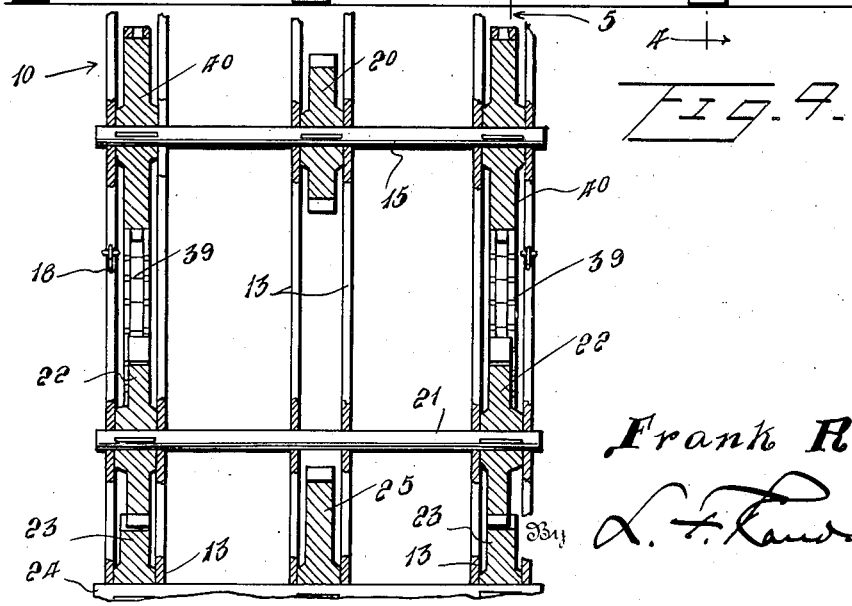
Inventor
Frank Radich
By
Attorney

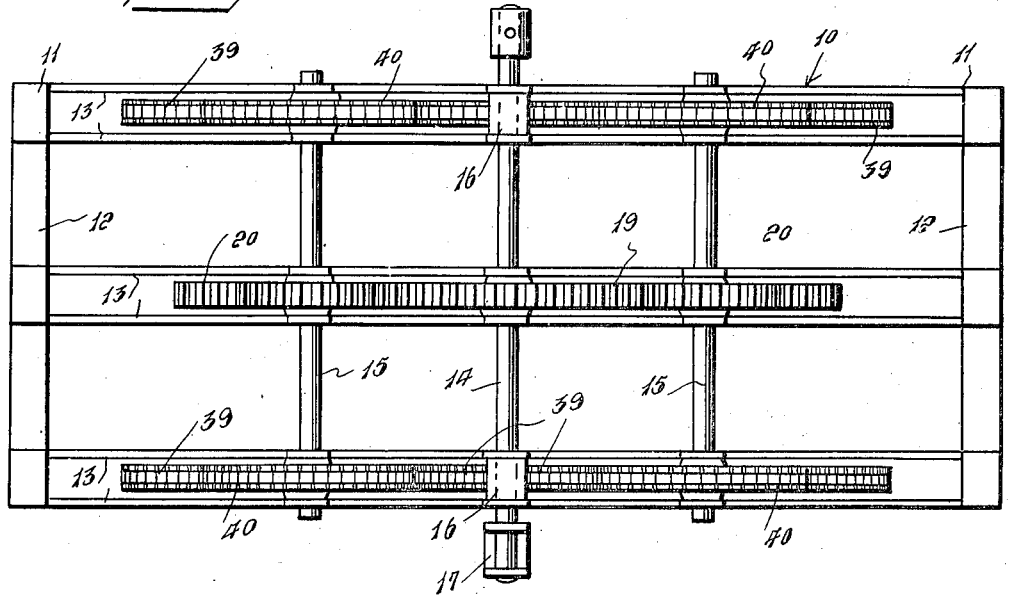
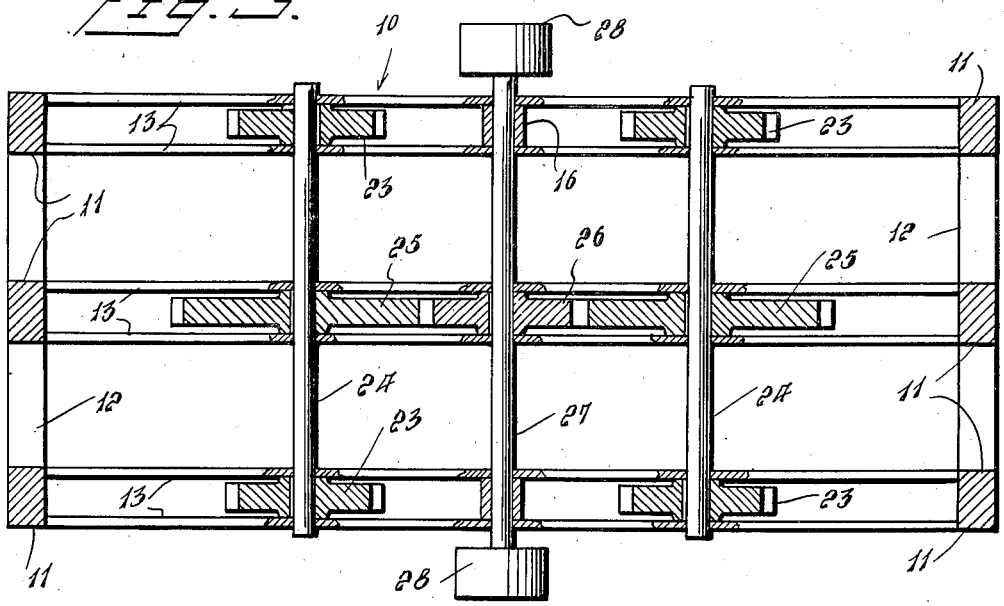

Aug. 5, 1941.  F. RADICH  2,251,856
POWER DEVICE
Filed Aug. 8, 1940  3 Sheets-Sheet 3
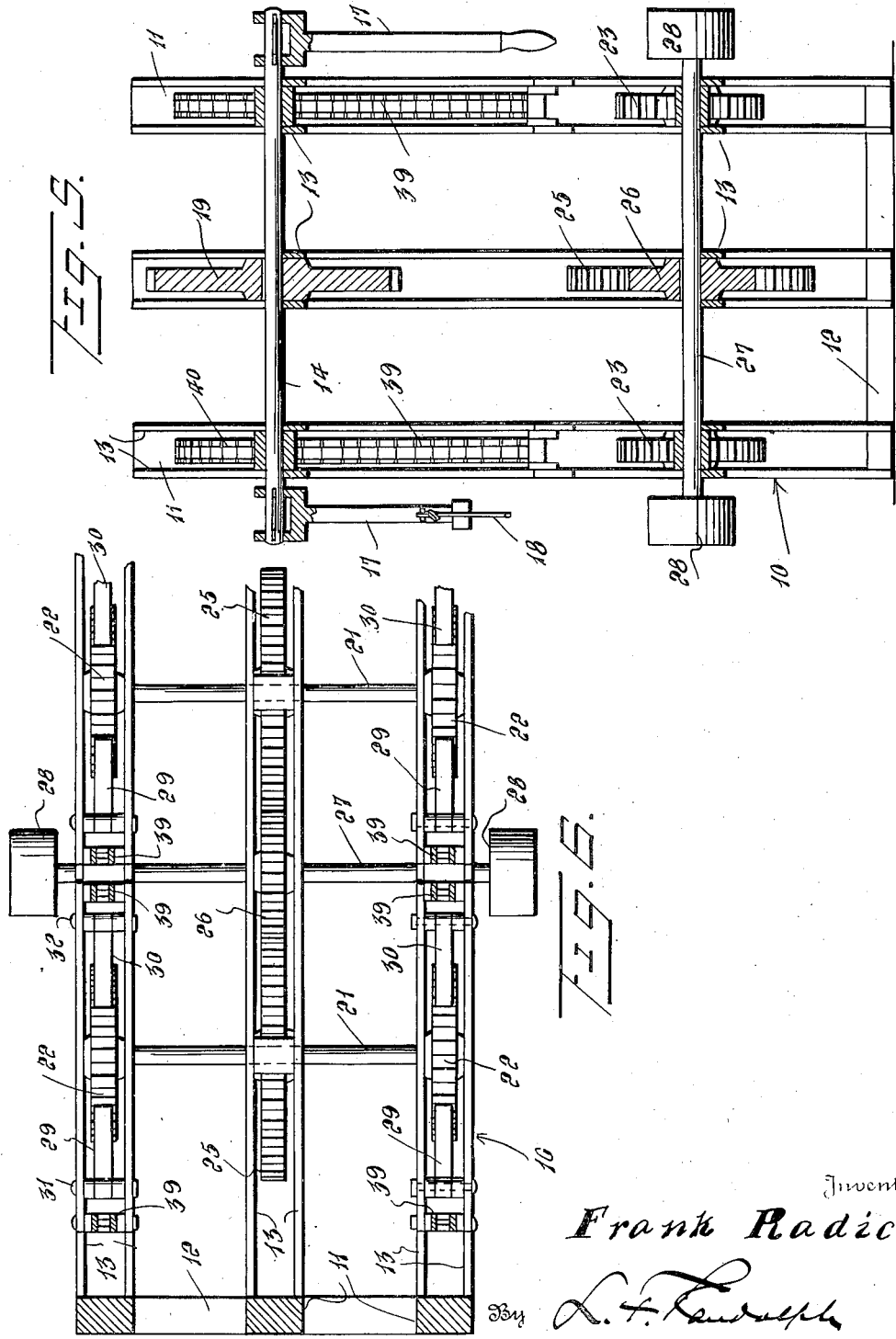
Inventor
Frank Radich
By
Attorney Patented Aug. 5, 1941

2,251,856

UNITED STATES PATENT OFFICE 2,251,856

POWER DEVICE

Frank Radich, Bluefield, W. Va.

Application August 8, 1940, Serial No. 351,785

3 Claims. (Cl. 74—136)

This invention relates to a power device and it aims to provide a construction whereby power to propel boats, for some uses in factories, and otherwise, may be produced as continuous rotary motion through manual operation by partial rotations in opposite directions.

The more specific objects will become apparent from a consideration of the description following taken in connection with accompanying drawings illustrating an operative embodiment.

In said drawings—

Figure 1 is a view of the device in side elevation;

Figure 2 is a plan view of the device;

Figure 3 is a horizontal section taken on the plane of line 3—3 of Figure 1;

Figure 4 is a vertical section taken on the plane of line 4—4 of Figure 1;

Figure 5 is a vertical section taken on the plane of line 5—5 of Figure 1, and

Figure 6 is a horizontal section taken on the plane of line 6—6 of Figure 1.

Referring specifically to the drawings wherein like reference characters designate like or similar parts, a skeletonized framework is provided at 10 to support the operating parts. Such frame has solid posts or uprights 11 at the corners and ends and they are connected together by solid frame pieces 12, while the remaining frame parts preferably consist of pairs of spaced bars as at 13.

Journaled in parallelism across the top of the frame 10 are transverse shafts 14 and 15, there being one of the former and two of the latter, the former being journaled in suitable bearings 16 and adapted for manual oscillatory movement or partial rotation first in one direction and then in the other through the operation of a handle or crank 17, the motion of the latter in both directions being limited by flexible cables or the like 18, fastened thereto and fastened to the frame 10.

Midway of the ends of operating shaft 14 a gear wheel 19 is keyed thereto which is enmeshed with gear wheels 20 keyed to the adjacent shafts 15.

Journaled on the frame 10 parallel to the shafts 15 and in line and below the same are shafts 21 having gear wheels 22 keyed thereon and which are enmeshed with gear wheels 23 below the same and keyed to shafts 24, journaled on the frame 10 in parallelism to the shafts 15. Also keyed to the shafts 24, are gear wheels 25 which are enmeshed with a gear wheel 26, keyed to a shaft 27, journaled on the frame 10 below the shaft 14. On one or both ends or otherwise on the shaft 27, power take-off pulleys or the equivalent 28 are provided, since the shaft 27 is used as a power take-off shaft.

Co-acting with each gear wheel 22 on opposite sides of vertical lines passing through their axes, are pawls 29 and 30, it being understood that pawls 29 are used when pawls 30 are thrown back or disengaged from gear wheels 22 and that pawls 30 are used when pawls 29 are thrown back or disengaged from said gear wheels 22. Said pawls are pivoted at 31 and 32 to levers or links 33 and 34 which in turn are pivoted at 35 and 36 to arms 37 and 38 of the frame 10. The opposite ends of sprocket chains 39 are fastened to the outer ends of the links 33 and 34 and such sprocket chains are trained over sprocket wheels 40 keyed to the aforesaid shafts 15.

It will be noted that all of the gear wheels, sprocket wheels and sprocket chains, are disposed between adjacent pairs of the bars 13, whereby such parts are better positioned and held against danger of accidental displacement.

As a result of the construction described, when lever 17 is rocked, the turning thereof in one direction will cause the pawls 29 (with pawls 30 disengaged from gear wheels 22) to turn the gear wheels 22 clockwise, the movement of the handle being limited by the co-acting flexible element 18, while partial rotation of said handle 17 in the opposite direction will (with pawls 29 disengaged from gear wheels 22) through the action of pawls 30, also move the gear wheels 22 clockwise. Thus the alternate partial rotations of the handle 17 and associated gearing, will move the pawls 29 and 30 so as to operate the gear wheels 22 continuously in one direction and such gear wheels through those at 23, 25 and 26 will impart continuous rotation to the shaft 27 from which power may be taken off for use in any suitable manner. It will be understood, that the links 33 and 34 pivot at 35 and 36 to accommodate the movement of chains 39 and the action of the pawls 29 and 30.

Various changes may be resorted to provided they fall within the spirit and scope of the invention.

I claim as my invention:

1. Power apparatus of the class described including a rotary member, pawls selectively engaging said rotary member operative one at a time, means operable a partial rotation in one direction to operate one pawl, said means being operable a partial rotation in the other direction to actuate the other pawl, links carrying said pawls, means pivotally mounting the links, a flexible element connected to the links, consisting of a sprocket chain, a sprocket wheel over which said chain is trained, and manually operable means to drive the sprocket wheel alternately in opposite directions.

2. Power apparatus of the class described including a rotary member, pawls selectively engaging said rotary member operative one at a time, means operable a partial rotation in one direction to operate one pawl, said means being operable a partial rotation in the other direction to actuate the other pawl, links carrying said pawls, means pivotally mounting the links, a flexible element connected to the links, consisting of a sprocket chain, a sprocket wheel over which said chain is trained, manually operable means to drive the sprocket wheel alternately in opposite directions, means to limit the said movement in alternate directions, and power take-off means operated by said rotary member.

3. Power apparatus of the class described including a rotary member, pawls selectively engaging said rotary member operative one at a time, means operable a partial rotation in one direction to operate one pawl, said means being operable a partial rotation in the other direction to actuate the other pawl, links carrying said pawls, means pivotally mounting the links, a flexible element connected to the links, consisting of a sprocket chain, a sprocket wheel over which said chain is trained, manually operable means to drive the sprocket wheel alternately in opposite directions, means to limit the said movement in alternate directions, power take-off means operated by said rotary member, a mounting frame, said frame having portions consisting of relatively close bars, and the gear members and sprockets being located between adjacent bars.

FRANK RADICH.